United States Patent [19]

Zeigner et al.

[11] Patent Number: 4,576,244

[45] Date of Patent: Mar. 18, 1986

[54] DIETER'S WEIGHING SCALE

[75] Inventors: Willard L. Zeigner, San Ramon; John A. MacIntosh, Cupertino, both of Calif.

[73] Assignee: Zemco, Inc., San Ramon, Calif.

[21] Appl. No.: 582,892

[22] Filed: Feb. 23, 1984

[51] Int. Cl.⁴ .................. G01G 19/00; G01G 19/22; G01G 23/18; G01G 23/38

[52] U.S. Cl. ............................ 177/245; 177/5; 177/25; 177/45

[58] Field of Search .................. 177/3, 5, 6, 25, 45, 177/164, 177, 245, DIG. 6; 361/173-177

[56] References Cited

U.S. PATENT DOCUMENTS

| | | | |
|---|---|---|---|
| 3,534,499 | 10/1970 | Chaffee | 361/176 X |
| 3,826,318 | 7/1974 | Baumgartner | 177/3 X |
| 3,891,980 | 6/1975 | Lewis et al. | 361/175 X |
| 4,301,879 | 11/1981 | Dubow | 177/5 |
| 4,366,873 | 1/1983 | Levy et al. | 177/45 X |
| 4,423,792 | 1/1984 | Cowan | 177/245 X |

Primary Examiner—E. A. Goldberg
Assistant Examiner—Patrick W. Foster
Attorney, Agent, or Firm—Owen, Wickersham & Erickson

[57] ABSTRACT

A talking electronic scale for encouraging the use of and adherence to a preset diet program is disclosed. A user on the scale actuates a mechanism whose movement is transformed to electrical pulses to provide a digital readout of his present weight on a display. A microprocessor provides an electronic memory for storing a goal weight for the person and his weight each time he weighs, along with the date of each stored weight as well as a series of comments to be voiced. The microprocessor also compares the goal weight with the present weight to actuate a voice synthesis device connected to the microprocessor to provide preselected comments appropriate to the comparison. Audio means connected to the voice synthesis device provides for such comments to be audibly spoken to the user.

4 Claims, 12 Drawing Figures

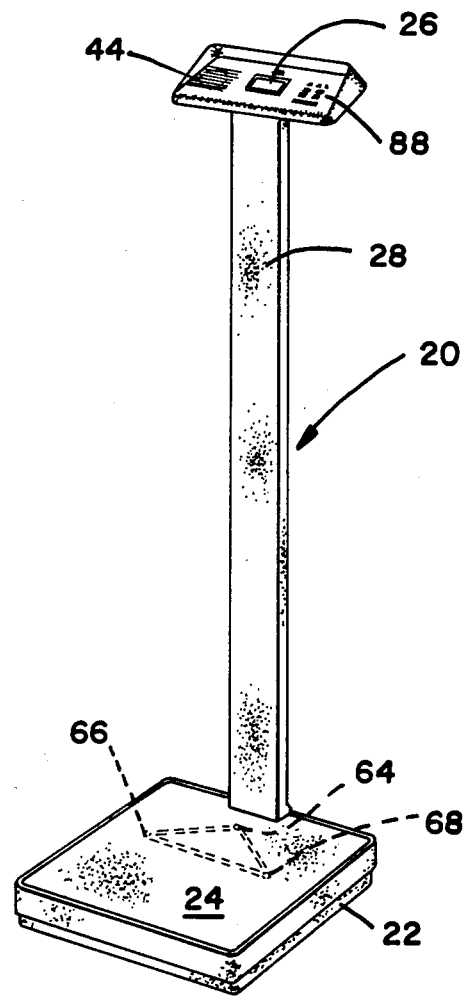
FIG _ 1
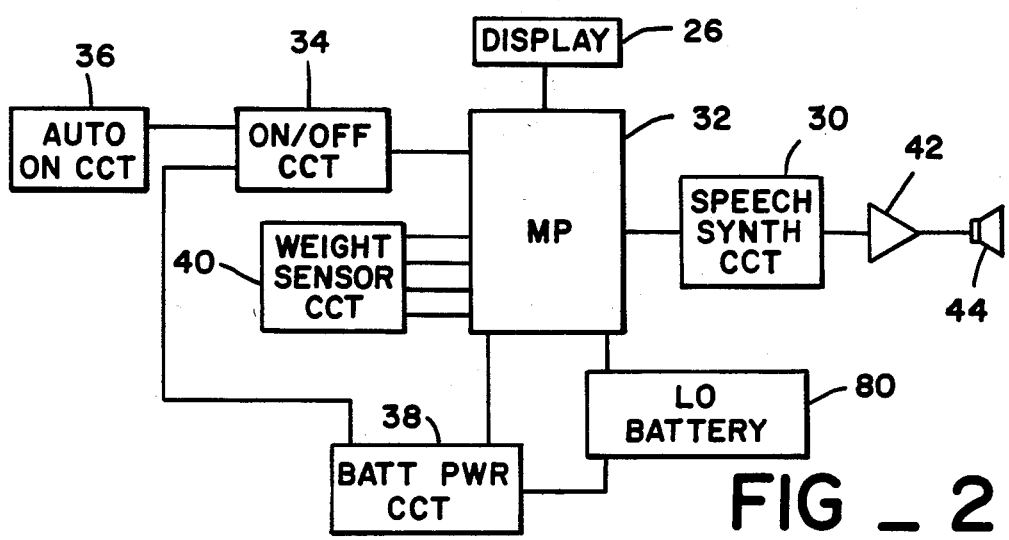
FIG _ 2

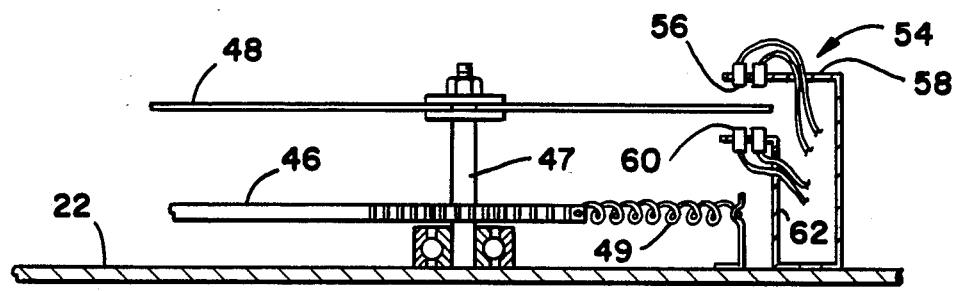
FIG_3
FIG_4
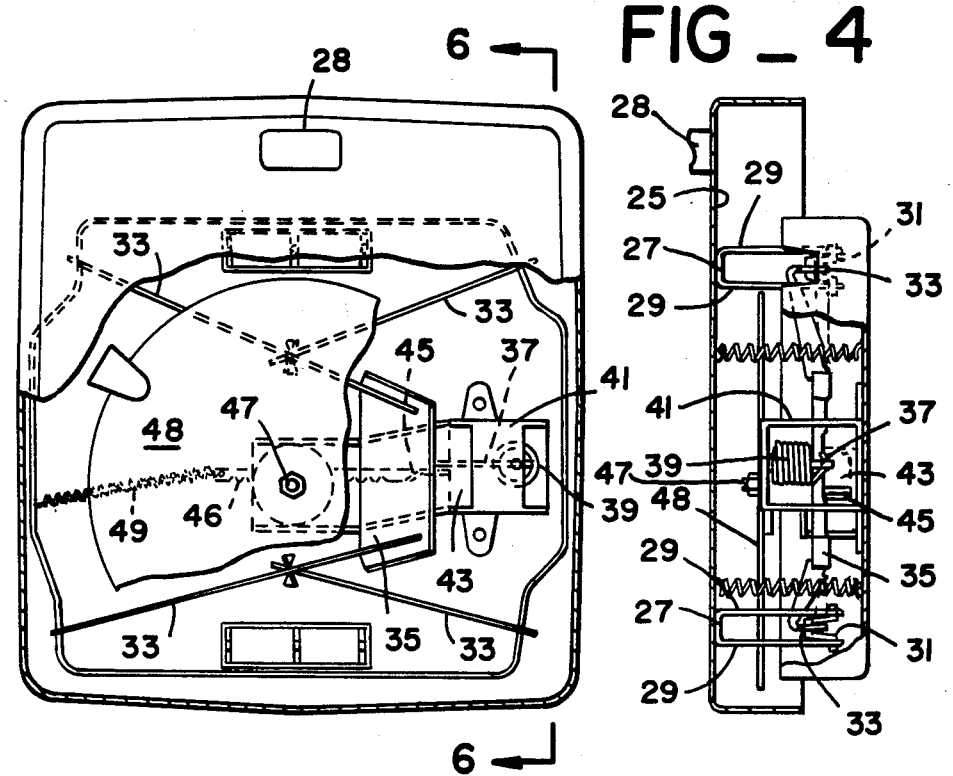
FIG_5  FIG_6

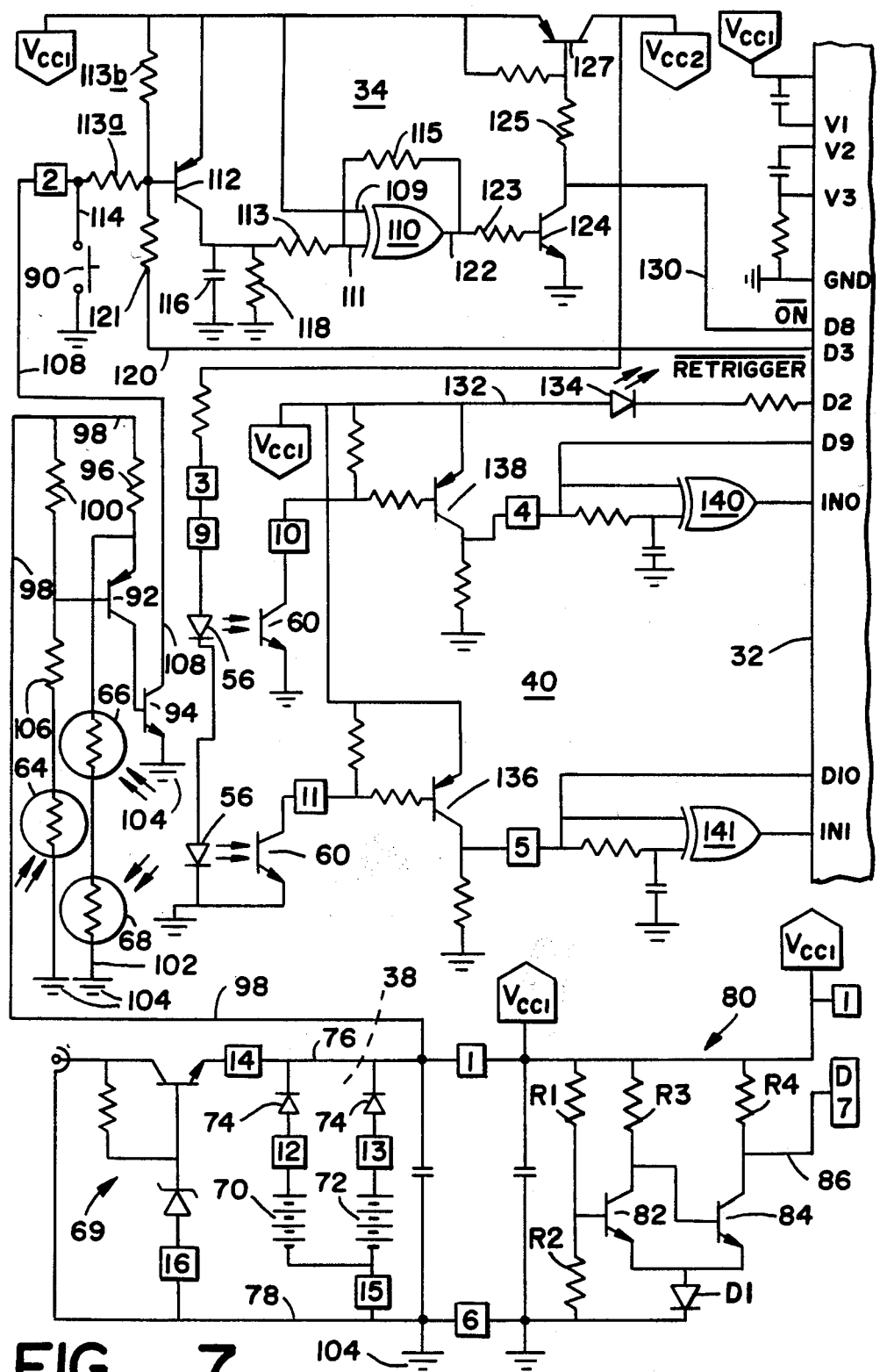
FIG_7

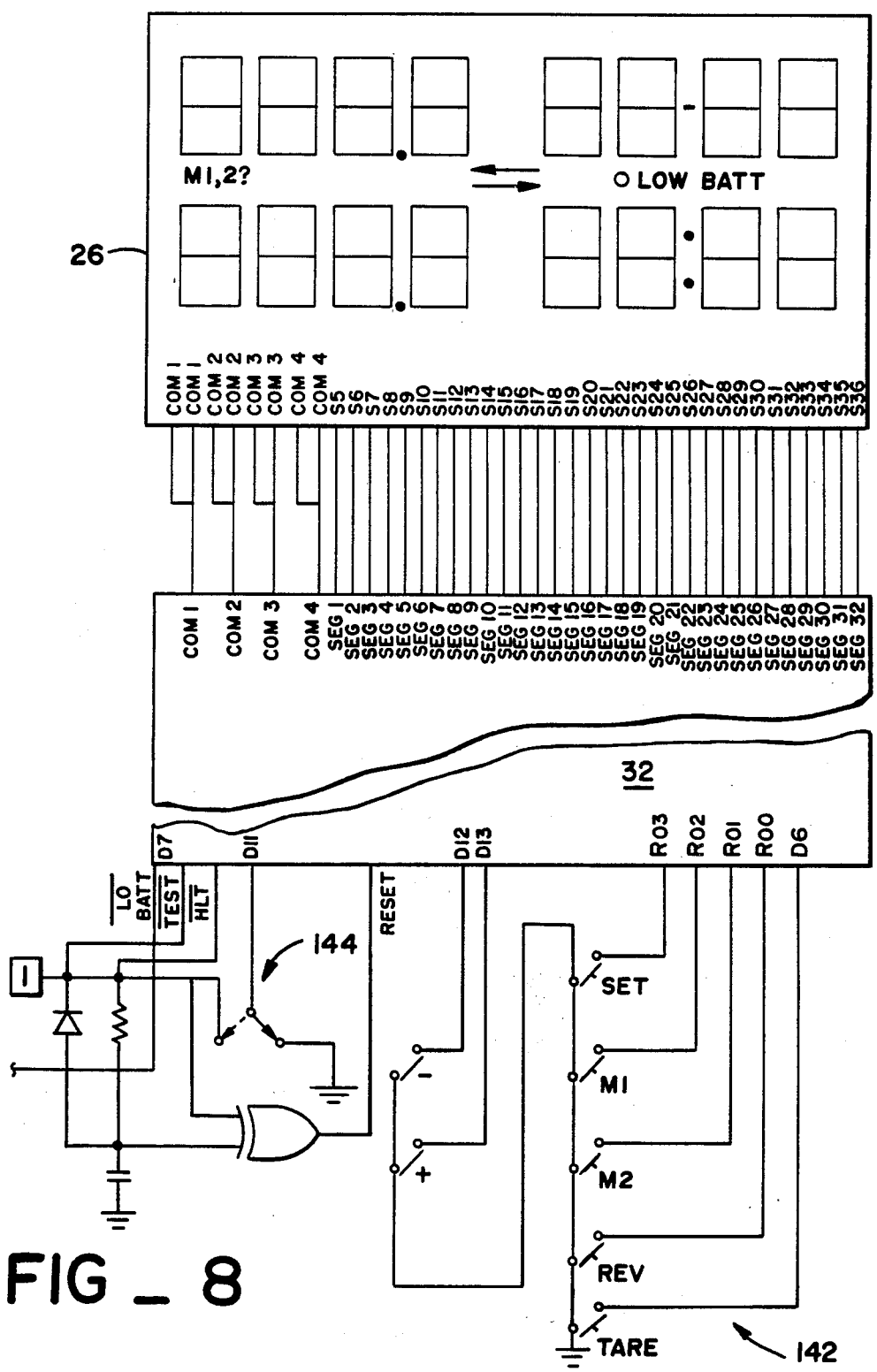
FIG_8

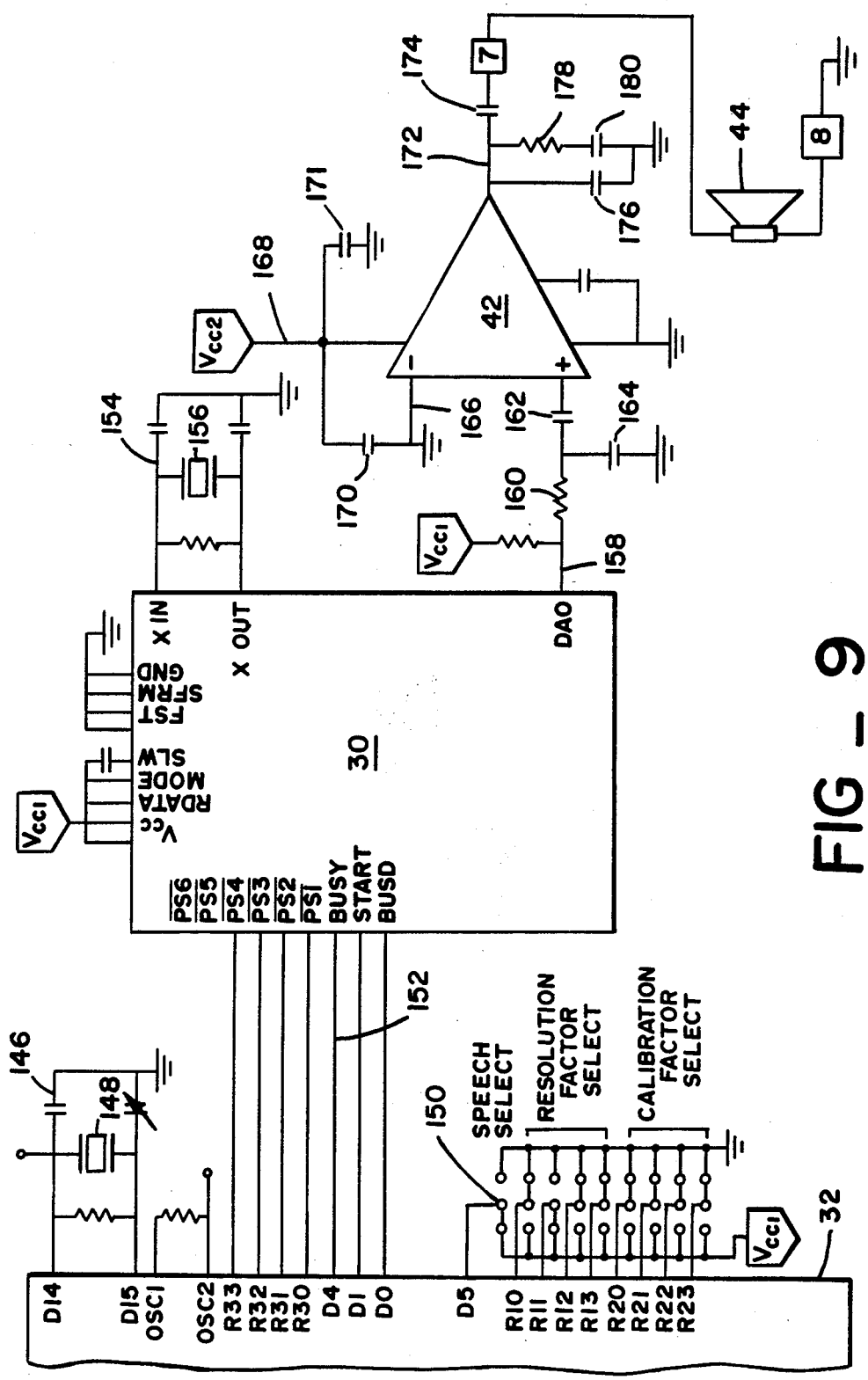
FIG_9

FIG _ 10A
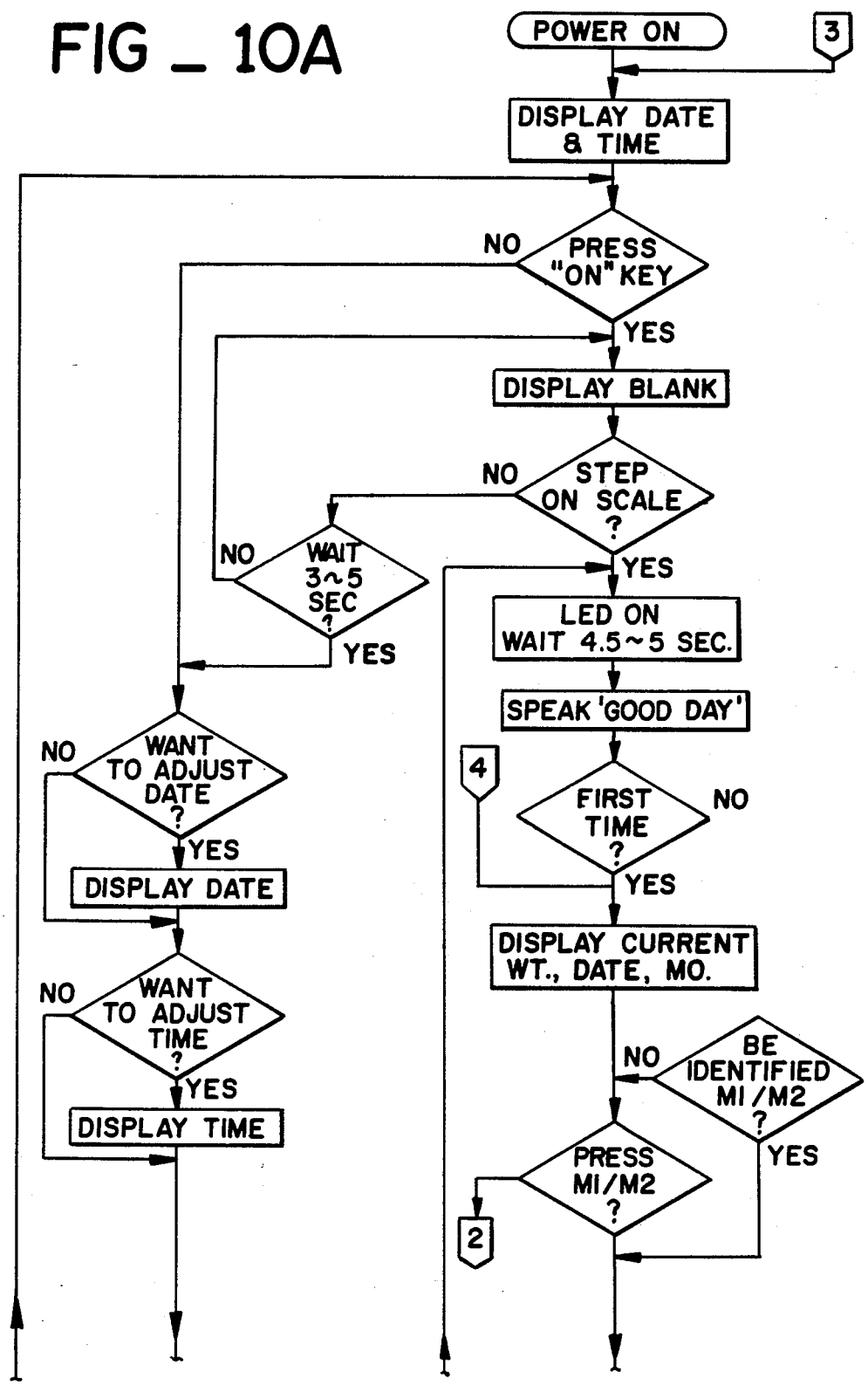

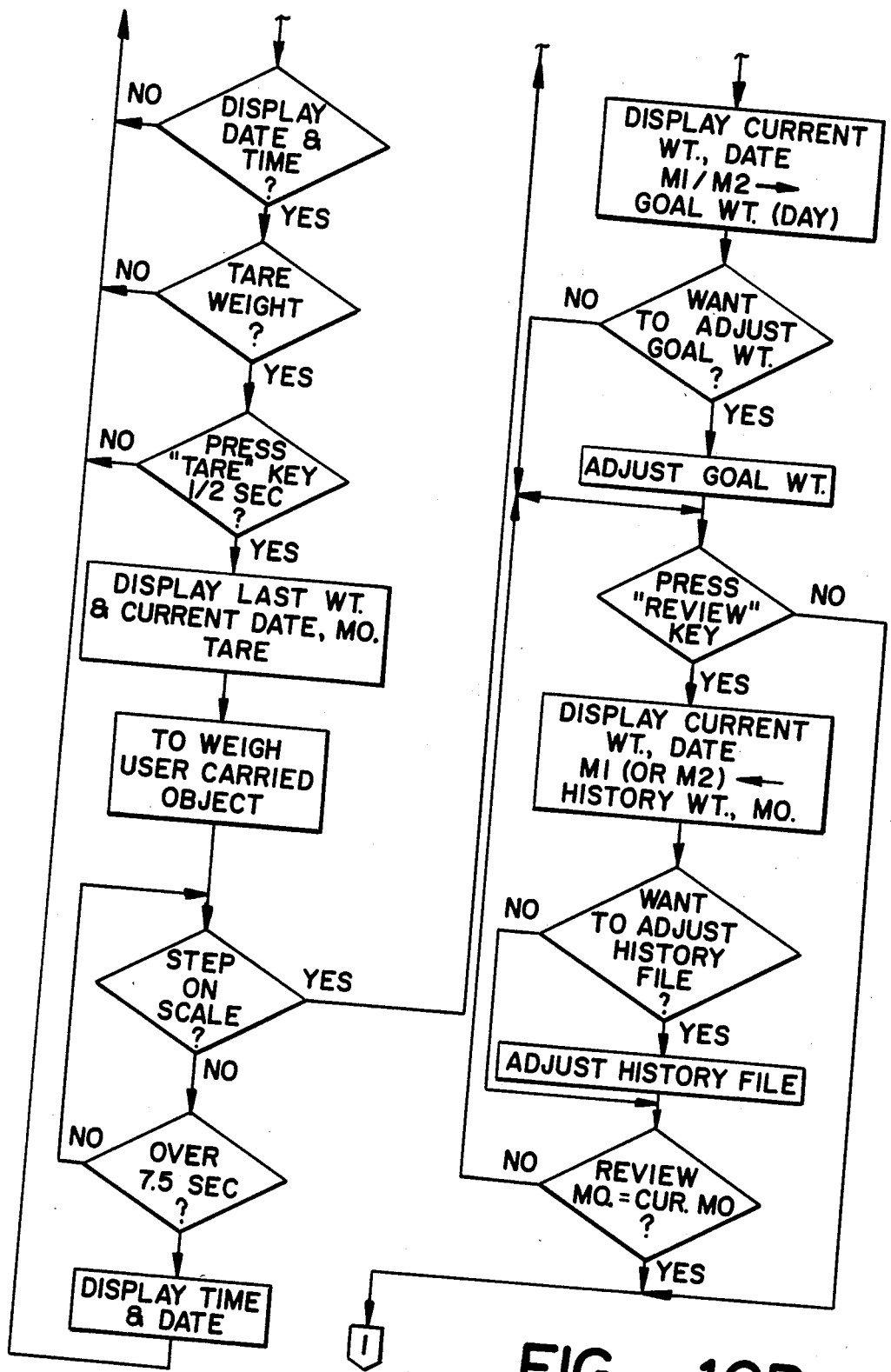
FIG _ 10B

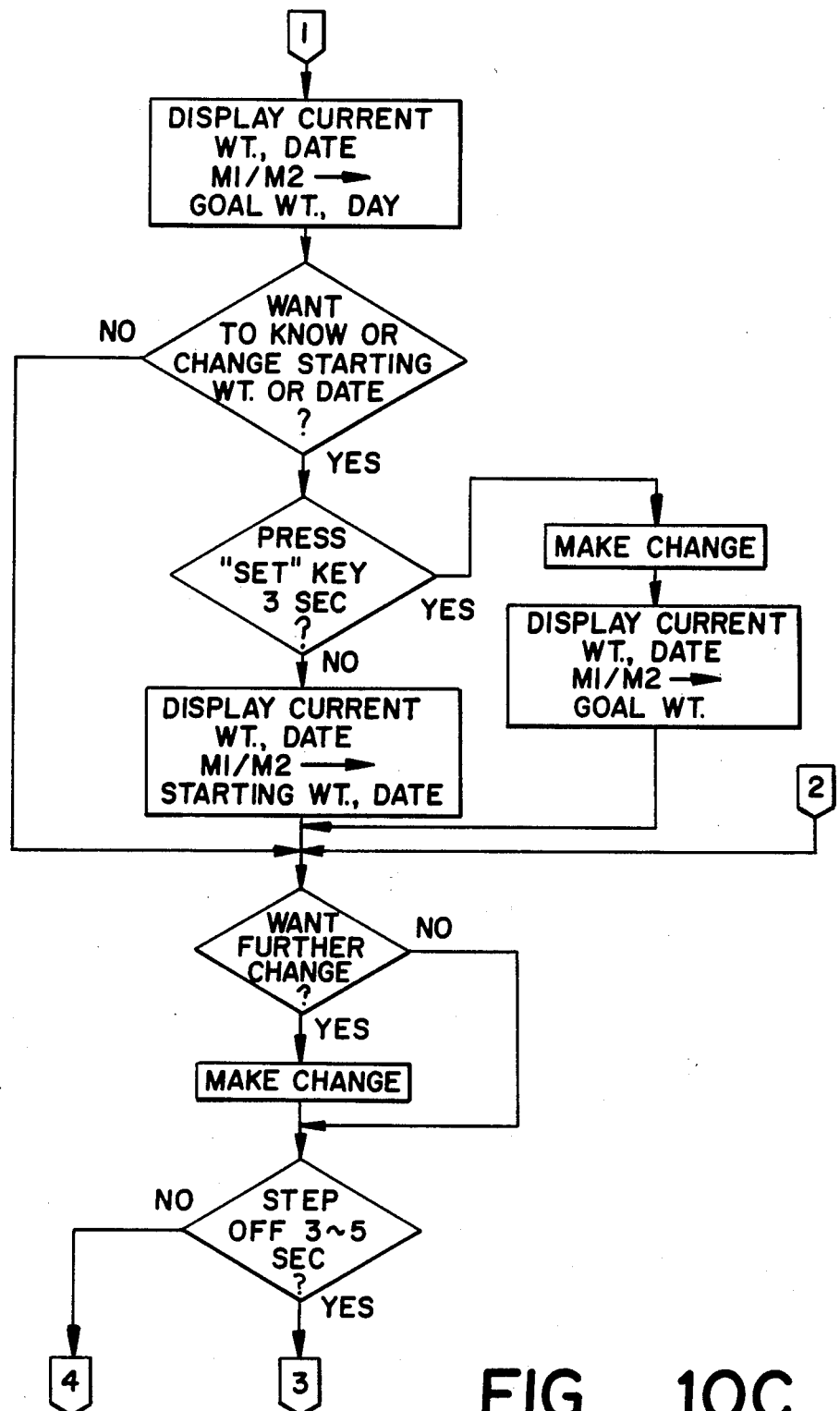
FIG _ 10C

DIETER'S WEIGHING SCALE

This invention relates to an improved electronic scale and method for measuring, storing, and displaying weight information and is specifically directed to help users follow a dieting or weight control program.

BACKGROUND OF THE INVENTION

Electronic scales utilizing a force voltage transducer to generate a weight signal that is provided to a display device to produce a digital readout are well known in the art, as shown in U.S. Pat. No. 3,967,690 and U.S. Pat. No. 3,994,217.

A more recent U.S. Pat. No. 4,318,447 discloses a scale utilizing a microcomputer to enable a dieter to enter a diet program having an objective weight and a given time interval in which to achieve that objective weight.

However, to provide additional incentive to a dieter, it has been found that voice comments in response to the progress of the dieter are extremely valuable. To provide effective voice responses it becomes necessary for the scale to identify the person in the diet program and to maintain his or her weight record to a degree sufficient to measure progress in the program. These things the prior art does not do.

Other desirable features lacking in the prior art include providing one or two users with their weight history. It is desirable to prevent loss of such history when the scale's batteries are replaced or when the device is unplugged or A-C power is cut off.

One general object of the present invention is to provide an improved electronic scale that will perform the aforesaid functions in combination with giving a visual digital readout of the user's present weight.

Another object of the invention is to provide an improved electronic scale that is compact, reliable, accurate and particularly well adapted for economy of manufacture and maintenance.

Another object of the invention is to provide an electronic scale that will automatically turn on when the user steps onto the platen of the scale.

Another object of the invention is to provide for baby weighing and weight programs for ladies, simplifying the weighing by providing for tare elimination.

Still another object of the invention is to provide an electronic scale that presents a visual display of a user's present weight, a predetermined goal weight (of a diet program), the present date, and a predicted number of days of diet program remaining before the goal weight is expected to be achieved.

Yet another object of the invention is to provide an electronic scale that will automatically identify a repetitive user, store the user's previous weight data, and provide voice responses to the user's present weight compared with such previous data.

A further object of the invention is to provide a record for one or two persons of their weights over the previous six months so that general trend(s) in weight fluctuation can be noted.

Another object of the invention is to provide for adjusting each history weight so that if a peak or low weight does not happen to correspond to the anniversary, the weight stored can be externally corrected, by use of the "+" and "−" keys.

Another object of the invention to provide for retention of memory during power cut-off in battery changing.

A still further object of the invention is to make it possible, if the power is lost, for the history file to be re-entered by advancing through the history file while still standing on the scale, so it can show "current weight". Each month's weight can be increased or decreased until it shows the correct history values.

SUMMARY OF THE INVENTION

In accordance with the present invention, the aforesaid objectives are accomplished by an electronic weighing scale utilizing a main control microprocessor in combination with ancillary sub-circuits. The scale has a platen to support the user, which activates a force transducer with a base housing, preferably in the form of a rotatable disc. Weight sensors located at the edge of the disc produce digital signals commensurate with the amount of disc rotation produced by the weight applied to the platen. Another group of sensors in the housing control an automatic on-off circuit connected to a battery power supply.

The main control microprocessor is connected to a digital readout display that is configured to show a user's present weight, the present date, and a preset goal weight, in addition to a predicted number of days of a diet program that remain before the user reaches his preset goal weight. The display, which is mounted on a part extending upwardly from the base housing, also contains an audio speaker and voice synthesis circuitry connected to the main processor. The main processor is pre-programmed to identify one or two persons who are participating in a diet program having pre-established weight goal parameters and also to maintain accumulated weight data on each user over a period of time. When one of the two users steps on the scale, the scale will automatically turn on, identify and greet the user, record his or her present weight, compare it with the last previous weight, and provide a verbal comment based on the present weight compared with that previous weight. The response comments provided by the scale are programmed to provide a psychological incentive to the dieter user to maintain his or her program or improve it if necessary.

Thus, the invention provides a talking electronic scale for encouraging the use of and adherence to a preset diet program. It has weighing means for determining the weight of a person on the scale, display means connected to the weighing means for displaying the weight, and memory means connected to the weighing means for storing a goal weight for the person and his weight each time he weighs, along with the date of each stored weight, and a series of comments to be voiced. It also has comparison means for comparing his present weight, his most recent past weight, and his goal weight, voice synthesis means connected to the comparison means and to the memory means for providing preselected comments appropriate to the comparison, and audio means connected to the voice synthesis means for speaking those comments audibly to the user.

Preferably, the scale has selection means connecting the voice synthesis means to the memory means and the comparison means, for choosing one of four different types of comments stored in the memory means, namely a first comment type appropriate to holding the weight substantially without change or with mild progress toward the goal, a second comment type appropriate to substantial progress toward the goal, a third comment type appropriate to mild retrogression, and a fourth comment type appropriate to substantial backsliding.

The scale may also have manually activated individual identification means, for use by the user in his first weighing in a diet program, coupling his scale identity and initial weight and placing them in the memory means. Then recognition means are connected to the memory means for subsequently identifying that user each time he weighs by the relative closeness of his weight to his last previous weight, so long as he does not vary from that weight by more than a preselected amount. Address means connect the recognition means to the voice synthesis means, so that the comments are addressed to the user audibly by stating his scale identity.

Whether or not the scale talks, the weighing means preferably includes a weighing platform on which the user stands during weighing. That platform includes a pair of light-transmitting opening which are covered by the user's feet when he stands on the platform, and there are light-sensing means below each such opening. Activating means connected to the light-sensing means are responsive to the decrease in light due to the user's feet covering the opening, for activating the display means, comparison means, voice synthesis means, and audio means, all of which are normally de-activated. As a result, the present weight is displayed and the comments spoken soon after the user steps on the weighing platform. Preferably, the comments are delayed for a few seconds, to assure scale stability first. Preferably, the weighing platform also includes a third light-transmitting opening placed where it is unlikely that a user will cover it with his foot, for transmitting ambient room light. A third light-sensing means lies below this third opening and activates disabling means for preventing activation of the activating means when the ambient room light drops below a predetermined level. There is a manual overriding switch for activating said activating means regardless of status of any of said light-sensing means.

Display of goals, review of history in the weight-change program, and provision of tare elimination are also provided, as will be seen below.

Other objects, advantages and features of the invention will become apparent from the following detailed description of one embodiment thereof which is presented in conjunction with the accompanying drawing.

BRIEF DESCRIPTION OF THE DRAWING

FIG. 1 is a view in perspective of a weighing scale embodying the principles of the present invention;

FIG. 2 is a block diagram of the electrical circuitry for the scale of FIG. 1;

FIG. 3 is a fragmentary enlarged diagrammatic view of the scale base showing the disc sensor linkage and edge counter for the scale of FIG. 1, some parts being removed for clarity;

FIG. 4 is a fragmentary enlarged view of an edge portion of the disc sensor;

FIG. 5 is an enlarged plan view of the base portion of the scale of FIG. 1, with the platen removed to show the leverage system then beneath and the location of the "automatic-on" sensors;

FIG. 6 is a view in elevation and in section taken at line 6—6 of FIG. 5;

FIG. 7 is a circuit diagram showing the on-off circuits, the edge detection circuits, and the power supply circuit interconnected with the control microprocessor;

FIG. 8 is a circuit diagram showing the interconnection of the control microprocessor keyboard and display unit;

FIG. 9 is a circuit diagram showing the interconnection between the control microprocessor and the speech synthesis processor with its related circuitry;

FIGS. 10A, 10B and 10C comprise a flow chart illustrating the general operation of a dieter's weighing scale according to the invention.

DETAILED DESCRIPTION OF EMBODIMENT

With reference to the drawing, FIG. 1 shows a scale 20 embodying the principles of the present invention. The scale 20 comprises a base housing 22 covered by a movable platen 24 for supporting the person being weighed. A visual readout display 26 is preferably mounted on a support post 28 that extends to a suitable height from the base housing 22 so as to be conveniently readable by the user. When the scale 20 is not in use, the time and date are displayed. The scale is electrically powered by batteries or by an A-C adapter and is controlled so that when a person stands on the platen 24, the electrical circuitry will turn off the time and date display and place the scale in the weighing mode, a fact which is indicated by lighting a colored LED. Then the person's weight will be shown digitally on the readout display 26 after about 4–5 seconds, during which the mechanism settles to a final or stable position.

As indicated by the block diagram of FIG. 2, the electrical system provides other features according to the invention, including a voice synthesis integrated circuit 30 that provides certain pre-programmed audio comments selected to increase a dieter's motivation and interest in a weight control program. A central component of the electrical system is a microprocessor 32, preferably in the form of a single integrated circuit semiconductor device that can be programmed in a desired manner. The microprocessor used in one embodiment of the invention is a Hitachi HD44790A45. It preferably includes a central processing unit (CPU), a random access memory (RAM), and a read only memory (ROM). Connected to the terminals along one side of the microprocessor 32 is an on/off circuit 34 with an automatic "on" sub-circuit 36. A battery power circuit 38 is connected to the microprocessor 32 and to the on/off circuit 34. A weight sensor circuit 40 which generates digital pulses commensurate with the weight of a person on the platen is also connected to the microprocessor 32. Along another side of the microprocessor 32 are terminals that connect with the digital display 26 to provide readouts of current weight, date, time, etc. Terminals along yet another side of the integrated circuit microprocessor 32 are connected to the speech synthesis integrated circuit 30, which may be a Hitachi HD61885B28. This integrated circuit is programed to produce the verbal, audio words or phrases which, when triggered in response to an input, are forwarded through an amplifier 42 to a speaker 44 located in the display housing.

The development of signals furnished to and provided by the microprocessor 32 will be described below in greater detail with respect to the sub-circuit components of FIG. 2.

Secured to the underside 25 of the platen 24, see FIGS. 5 and 6, near its four corners are four dependent inverted-U-shaped brackets 27 with two dependent arms 29 each. Locked in slots in these arms 29 near their lower ends are brackets 31, and these engage respective lever arms 33. The lever arms 33 extend generally inwardly, though not radially, and are linked in pairs to transmit their downward force to a plate-like member 35 bearing on another lever arm 37. The lever arm 37 extends to and is secured at its distal end to the lower end of a stiff spring 39, mounted at its upper end to a bracket 41. The distal end of the lever arm 37 is also connected to a pivoted lever member 43 which is connected to the distal end of a bar-like member 45 carrying a rack 46 that extends in beyond a vertically mounted pinion-shaft member 47 and to one side thereof. Depression of the lever arms 33 thus results in the rack 46 moving toward the opposite end of the housing 22 from that near which lie the bracket 41 and the stiff spring 39.

The rack 46 engages and rotates the pinion portion of the member 47 on the shaft portion of which is rigidly mounted an optically coded disc 48 within the scale housing 22. A return spring 49 is secured at one end to a rack 46 and its other end to the housing 22. These elements function so that the weight applied to the platen 24 is directly proportional to the total amount of rotation of the coded disc 48 from a zero point. Adjustment of the stiff spring 39 provides for accuracy in factor calibration. The precise mechanical arrangements of the leverage and the rack-and-pinion system are well known to those skilled in the art of weighing scales, and need not be described in further detail.

As shown in FIG. 4, near the periphery of the optical disc 48 is a coded pattern comprised of two circular bands 50 and 52 of alternating clear and opaque areas. As the disc 48 rotates when the platen 24 is loaded, these coded bands 50 and 52 pass between upper and lower arms of a sensor 54 (FIG. 3) that produces digital signals commensurate with disc rotation. In the embodiment shown, this sensor 54 is comprised of a pair of infrared emitters 56 fixed to the upper arm 58 of a sensor support in the base housing 22. Directly below these emitters 56 are a pair of photo transistors 60 fixed to a lower arm 62 of the sensor support. As the disc 48 is rotated during a weighing cycle, the photo transistors 60 produce the digital signals comprising the input data for measuring the actual weight applied to the platen 24.

Mounted within the base housing 22, as shown in FIG. 1, are three spaced-apart photo cell switch sensors 64, 66 and 68, which are all installed facing upwardly. The first or auto light sensor 64 is centrally located in the housing near the post 28, and the other two sensors 66 and 68 are located rearwardly therefrom on opposite sides of the housing 22. The auto light sensor 64 is dependent on the environmental light level of the area or room where the weighing scale is used to control the threshold of the auto turn-on reference circuit 36. This sensor 64 can be set so that, if the light is not adequate to read the scale display, the reference circuit will cut off the auto turn-on circuit function. The other two switch sensors 66 and 68 are located at normal feet placement positions just under the scale platen 24. When either foot of a user stepping onto the platen 24 blocks enough light to one of these switch sensors 66 or 68, the auto turn-on circuit 36 will turn on the photo emitters 56 of the weighing mechanism sensors 54 and then trigger the main command module or microprocessor 32 to be ready to count weight.

As described above with respect to FIG. 2, the aforesaid digital signals used to provide the various functions according to the invention are furnished through sub-circuits to a central control for the scale, preferably provided in the form of the microprocessor circuit 32. As indicated in FIG. 7, pads along one side of this device are adapted to connect with the various inputs from the power supply circuit 38, the on/off circuit 34, and the weight/signal detection circuit 40.

Electrical direct current power for the scale 20 may be supplied from an external source through a standard (9 VCD, 500 MA.) adapter 69 in the power circuit or from suitable batteries. A set of four 1.5 volt D type batteries 70 in series provides adequate power. They are provided in parallel with a similar set of backup batteries 72. When the batteries 70 have deteriorated, the batteries 72 back them up. When the batteries 70 are removed for replacement, the batteries 72 are left in place to preserve the contents of the memory. Then, when fresh batteries 70 have been fully replaced and are operative, the batteries 72 may be replaced without loss of memory. When an A-C adapter is used, at least one set of batteries 70 or 72 is also used, to insure that the memory will not be lost in case of power failure or in moving the scale 20 from one power plug to another. Each set of batteries 70, 72 is connected in series with a diode 74 between a positive lead 76 and a ground lead 78. This power sub-circuit is connected to connectors 1 and 6 on a printed board and through a low battery sub-circuit 80 to the microprocessor 32. (The numbers in squares in FIG. 7 are, connectors, some of which may not be referred to in this description.)

The low battery sub-circuit 80 is comprised of a pair of transistors 82 and 84 (e.g. MPS 5172) connected between the power leads from the terminals 1 and 6. The sub-circuit 80 provides a Schmitt trigger arrangement. Resistors R1 and R2 (e.g. at 332 kohms and 86.6 kohms, respectively) are used as a voltage diode connected to the base of the transistor 82, and a diode D1 forms a voltage reference which is relatively independent of the power supply voltage. The collector of each transistor 82, 84 is respectively connected to a resistor R3 (e.g. 470 kohms) and a resistor R4 (e.g. 140 kohms). When the batteries 70 and 72 get low, the voltage at the base of the transistor 82 becomes too low to contain all the current necessary in the resistor R3 to prevent the transistor 84 from conducting, then the base of the transistor 84 can accept some of the current provided by the resistor R3. Then the transistor 84 turns on fully and with the additional current from the resistor R4, the emitter of the transistor 84 increases the voltage at the emitter of the transistor 82. This further reduces the capability of the transistor 82 to support the R3 current. Thus, a regenerative action takes place, transferring all the current in the diode D1 to the transistor 84. The voltage at the collector of the transistor 84 also changes value from a "high" level to a "low" level.

Thus, when the batteries 70, 72 provide less than 4.5 V, the low battery circuit 80 provides an output signal from the collector side of transistor 84 through a lead 86 to a pad D7 on the microprocessor 32. Through the microprocessor 32, the low battery signal is furnished to the display 26 where it actuates a liquid crystal (LCD) "Lo Batt" indication 88 (FIG. 1). Also extending from both the battery and low battery sub-circuits is a main power lead (Vcc1) which is connected to and furnishes power to other parts of the circuitry.

As FIG. 7 shows, the scale 20 has a manual "on" switch 90, but it is also provided with circuitry that will automatically turn the power "on" when a user steps on the weighing platen 24. As shown in FIG. 1, the three light sensitive photo cells 64, 66 and 68 enable this automatic "on" feature and are mounted at spaced-apart locations within the base housing 22 and under the platen 24. The photo cell 64 serves as a reference that receives ambient light. When light falling on either of the other two sensors 66 or 68 is reduced (by a user's foot placed over the photo cell position) the automatic "on" sub-circuit 36 is activated. As shown in FIG. 7, the latter sub-circuit comprises a pair of transistors 92 and 94 (e.g. 2N 3904). The first transistor 92 has its emitter connected through a resistor 96 (e.g. 100 kohms) to the plus lead 98 of the battery circuit. This positive voltage is also supplied through a resistor 100 (e.g. 47 kohms) to the base of the transistor 92. The emitter of the transistor 92 is also connected through the sensor photo cells 66 and 68 in series via a lead 102 to the negative or ground lead 104 of the battery circuit. A lead interconnecting the resistor 100 and lead 104 contains a resistor 106 (e.g. 4.7 kohms) and the reference photo cell 64 in series. The collector of transistor 92 is connected to the base of transistor 94, whose collector is connected via a lead 108 to a circuit board connector 2 and thence via a lead 114 to the positive junction terminal of the manual "on" switch 90. The emitter of transistor 94 is connected to the ground lead 104.

In the operation of this automatic "on" circuit, the reference photo cell resistance 106 serves to adjust the base voltage on the transistor 92 and thus to track the voltage from the other light sensors 66 and 68 with a varying environmental light level. When light falling on either sensor 66 or 68 is reduced (when a user's foot is placed over the sensor position), the voltage on the emitter of the transistor 92 goes high and it turns on, this also turns on the transistor 94, thereby supplying an "on" signal to the other circuitry.

The "on" key or the "auto on" low signal is provided through the on-off circuit 34 which provides certain buffering and delay functions to facilitate proper microprocessor operation. A first section of this circuit comprises an exclusive "OR" device 110 (e.g., CD4070). One input 109 to this "OR" circuit is from the power supply (Vcc1), and the second input via a lead 111 extends through a resistor 113 (e.g. 3.3 megohms) from the collector of a transistor 112 (e.g. 2N 3906) whose base is connected via a resistor 113a (e.g. 22 kohms) by a lead 114 from the "on" switch and whose emitter is connected to the power supply (Vcc1). The transistor 112 also has its base connected through a resistor 113b (e.g., 5, 6 kohms) to the power supply Vcc1. A capacitor 116 (e.g. 1 micro farad) and a resistor 118 (e.g. 2.7 megohms) are connected in parallel to ground from the collector input lead 111 in order to provide a delay function (e.g. 3-5 seconds) for the "OR" device 110. The lead 114 from the "on" switch 90 is also connected by the resistor 113a and a resistor 121 (e.g. 22 kohms) and a lead 120 directly to an input pad D3 on the microprocessor 32.

In parallel with the "OR" circuit 110 the lead 111 is connected to the output lead 122 of the "OR" circuit 110 via a resistor 115 (e.g. 10 Megohms). The output 122 of the "OR" circuit 110 is connected via the lead 122 and a resistor R3 (e.g. 15 kohms) to the base of a transistor 124 (e.g. MPS 5172) whose emitter is connected to ground and whose collector is connected via a resistor 125 (e.g. 680 ohms) to the base of a transistor 127. The emitter of the transistor 127 is connected to the power supply Vcc1 and its collector provides a power output (Vcc2) for the weight-signal detection circuit. The collector of the transistor 124 is also connected by a lead 130 to an input pad D8 of the microprocessor, to provide an "on" signal.

Thus, when the "on" key or "auto on" low signal is present, the circuit 34 provides a 3-5 second delay to tell the microprocessor to be ready for weighing. It also turns on the transistor 124 to provide voltage to the audio amplifier 42 for the voice synthesis circuit and to the infrared emitters 56 for the weighing sensor.

A lead 132 from the power supply (Vcc1) is provided through a red LED 134 to another output pad D2 on the microprocessor 32, to indicate, after either sensor 66 or 68 provides the pulse, that the weighing is in process.

When the infrared sensors 60 adjacent to the rotatable disc 48 turn on during a weighing cycle, the sense signal produced and supplied to the microprocessor 32 (at IN 0 and IN 1 terminals) change state, due to a temporary overrun of the disc 48, which provides the first weighing pulse. The circuit 34 functions to hold the "on" signal at input terminal D8 until the D9 and D10 inputs have settled and, after that, maintain the "on" signal for a few additional seconds, long enough to enable the user to observe the reading, or to continue to hold the "on" signal present if (a) the auto-on signal is present or (b) the manual "on" switch 90 is pressed, or (c) will be reset by any key press, when the keys are pressed to the hold on delay.

As shown within the sensor current 40 portions of FIG. 7, the infrared emitters 56 and the weighing sensors 60 of the edge detector circuit are connected between a positive power input and ground. Each photo sensor 60 is located adjacent to but on the opposite side of the disc 48 from its infrared emitter 56 (See FIG. 3). When light through a clear segment of the disc 48 strikes the photo sensors 60, two respective transistors 136 and 138 in the sensor circuit 40 are energized as an inverter amplifier to produce a signal (1) from the transistor 138 through a connector 4 to an exclusive "OR" device 140 whose output is connected to an interrupt input terminal IN 0 on the main microprocessor 32 and (2) from the transistor 136 through a connector 5 to an exclusive "OR" circuit 141 where output is connected to an interrupt input terminal IN 1 on the microprocessor 32.

When the microprocessor 32 sees the "on" signal provided at input D8 from circuit 34, it stops displaying time and date and looks at the interrupt input terminals IN 0 or IN 1 for a high-signal when the weighing sensor outputs of circuit 40 change from either low-to-high or high-to-low. Depending on the high or low states from the sensors 60 as seen at the microprocessor terminals D9 and D10 and which then changes once for each sensor 60 state changes to give either a positive count or a negative count, the microprocessor 32 can determine whether the user's weight is increasing or decreasing, (i.e. it can tell when the disc 48 reverses from overshoot to undershoot while settling at its final weight).

In FIG. 8, there are shown other circuit details of the microprocessor 32 including its connection with the digital display 26. The display 26 provides for four digits in the upper left-hand corner for indicating present weight in kilograms or pounds, up to 999 pounds and tenths of pounds to the right of a decimal point. Electronically alterable resolution is provided in steps from 1 lb. to 1/15 lb. (or 16 steps similar to 1 oz. each, but all steps are in decimal portions and the display will only show the closest 1/10 lb.). The resolution is ⅛ lb. increments.

The invention provides electronic calibration for "fine adjustment" of the accuracy. During assembly the spring tension is pre-adjusted to a known value. However, the tolerance is such that finished assembled scales vary by about ±3%. Mechanical adjustment after assembly would require many trial-and-error type tries, in order to center the accuracy at 1-2% of the actual. The electronics can be preset over a range of ±3.75% in 0.5% steps, and this allows ±4% pre-adjustment error to be trimmed to within 0.25%. For example, using the "electronic calibration", a divide subroutine is employed to address four inputs which represent a possible number of 0 through 15 in binary form. This number modifies the final weight measurement as determined by the mechanism and sensors by dividing it by a factor from 1.0000 through 1.0750 (representing a 0% to 7.5% adjust range in 0.5% steps). The pre-adjustment of the spring can be set to a nominal point 3.75% above 100 kg. (approx. 103-105 kg.). After assembly and during production testing, it is expected that the reading will fall in a range of 103±3 kg. This reading is marked on the mechanism for future reference and recorded for an electronic module to be manufactured with the corresponding calibration factor. The mechanism is matched with the electronic module for final test and packaging for shipment. Future field replacements can be matched by use of a code on both the electronic module and the base unit.

Below the actual weight digits are four digits which can be set to indicate the user's "goal" weight. In the upper right of the display are two adjacent sets of two digits to indicate the month and day, in either United States or International mode order. In the lower right of the display are four digits which are used alternatively to show (a) the time of day when not weighing, or (b) when weighing, the number of days required to reach the user's goal weight and (c) to review by the month, when in the "review" mode. Between the upper and lower digits on the right side of the display is the low battery indicator symbol 88, "Lo Batt", which is activated when the batteries 70 and 72 are low. The multiple lines from the microprocessor 32 to the display terminal 26 indicate the many connections required to activate the various digital characters of the display. Thus, between the upper and lower digits on the left side on the symbols M, 1, 2 ?, which activate to show the user how the machine identifies him or her, as will be explained below. In the center of the display 26 are two horizontal arrows. The arrow pointing to the right, when activated, denotes the future, i.e. goal projections. The arrow pointing to the left indicates the past, or that the device is in its review mode.

The four sets of digit groups, when the scale 20 is in use, normally indicate:
upper left—present weight,
upper right—present date,
lower left—goal weight,
lower right—number of expected days to goal.
In its review mode, the two lower digit groups give:
lower left—weights as of the month displayed on the right,
lower right—the month corresponding to the day on the upper right when the weight on the lower left was recorded.

Connected to input pads along the bottom side of the microprocessor as indicated in FIG. 8, are a series of key switches 142 identified as "SET" "M1", and "M2" and REV (review), and TARE, combined with "plus" or "minus" switches to the left, which enable the user to set weight goal values, re-enter his history file, and to change date figures on the display. Another slide-switch setting circuit 144 allows the user to set the display to readout in either pounds or kilograms.

In FIG. 9, the microprocessor 32 is shown with its various connections to the speech synthesis integrated circuit device 30 and other related functions. Connected to pads D14 and D15 of the microprocessor is a circuit 146 containing a watch-type crystal 148 that establishes a frequency for measuring time and calendar functions within the microprocessor 32. A jumper switch circuit 150 is provided which allows a connection of either Vcc1 power or ground to a processor pad D5, thereby enabling or disabling the speech aspect of the system.

Seven control leads 152 extend from the microprocessor 32 to the voice synthesis device 30, which can be programmed to produce preselected synthesized voice output signals to form certain words in response to the user's weight status.

Connected to the voice synthesis device 30 at X IN and X OUT pads is a resonator circuit 154 that includes an 800 KHz ceramic resonator 156. This circuit provides the click frequency for the timing and functioning of the speech processor. The speech processor may be the Hitachi HD61885 which uses the "Parcor" or "partial correlation" system. It is controlled by the main microprocessor 32 through the pads D0,D1, and D4, as well as by the address lines for R30, R31, R32, and R33 leading to address lines PS1, PS2, PS3, and PS4 on the speech processor 30; these latter lines are inputs used to indicate the ROM (Read Only Memory) locations for speech phrases which are previously programmed into the chip. The START pin is an input which commands the speech processor to initiate the speech utterance. The BUSY pin is an output which informs the main microprocessor 32 that the speech processor is performing its speaking functions and cannot obey any other commands until the speech phrase has ended. The BUSD pin is an "enable/disable" input which deactivates the speech processor 30 when the main processor 32 does not require its services, thereby reducing power drain on the batteries.

At the output terminal DAO of the voice synthesis circuit is produced a digital-to-analog output signal. This signal is fed via a lead 158 through a resistor 160 (e.g. 15 kohms) and a capacitor 162 (e.g. 0.1 mf) in series to the plus terminal of the amplifier 42. Another capacitor 164 (e.g. 2 nanofarad) is connected between ground and a junction between the resistor 160 and capacitor 162. The resistor 160 and the capacitor 164 together form a low pass filter for the analog signals produced in the output from the voice synthesis device.

Connected to the power supply input of the amplifier 42 is a power lead 168 from power source Vcc2 which operates only when the scale is in operation, in order to conserve power. This power is furnished through the lead 168 to one side of a capacitor 170 (e.g., 0.22 mf) whose other side is connected to a junction which is in turn connected to ground and also to the negative amplifier input from lead 166. The lead 168 is also connected to ground through another capacitor 171 (e.g., 0.22 mf).

The amplifier output is furnished through a lead 172 through a capacitor 174 (e.g., 33 microfarad) to a board connector 7. A branching circuit comprising a first capacitor 176 (e.g., 47 nf) in parallel with a resistor 178 and a capacitor 180 in series, connected to ground, provides a high frequency band pass limiting circuit to ensure that the audio amplifier does not oscillate. The speaker 44 is connected to the connector 7 and a connector 8, which is at ground.

In operation, the voice synthesis device 30, the amplifier 42 and speaker 44, all located in the display housing 26, function together to supply audio output to the scale user when the weighing process takes place and in response to conditions such as the last weight compared with the user's present weight, as will be explained below.

The detailed operation of the scale 20 may be best understood by reference to the general flow charts of FIGS. 10A, 10B and 10C.

The scale 20 has four operating modes, namely (1) clock mode; (2) normal scale mode; (3) goal mode; and (4) review mode. In use, the clock mode is always "on" so that power from the batteries 70 and 72 is being supplied constantly to enable the microprocessor 32 to furnish date and time signals to the display. If battery power falls below 5.1 volts, the low battery circuit 80 will actuate the blinking "Lo Batt" indicator 88 on the display 26, despite the mode which the scale is in.

Now, as described above with reference to FIG. 7 and assuming the power supply is adequate, the scale 30 can be turned "on" either manually (by actuating the key 90) or automatically by means of the automatic "on" circuit 36, as previously described. At this point, if the proper time and date are not shown on the display, they can be adjusted to do so by well-known setting procedures as used with digital clocks, and the appropriate setting buttons, SET, +, and —, are provided on the display console 26. To put the device in the TIME SET mode, the SET key is depressed, and the time is displayed in the lower right digit group. To set the hour, the + key is used to advance the hour one hour for each time the key is pressed. For minutes, the — key is used similarly. Then the SET key is pressed again to place the device in a DATE SET mode. The date will be displayed in the upper right digit group. The + key changes the month, and the — key changes the day of the month. When it is completed, the SET key is again pressed and the date and time are both displayed.

When the user steps on the scale, if the manual "on" switch had not been previously activated, the automatic "on" switch causes the display 26 to go blank and turns on the scale weighing circuit and also activate the voice synthesis circuit 30. The latter will be initially activated to produce a first opening comment from the voice circuit, such as, "good day", while simultaneously displaying the current time, date and present weight, the latter being supplied by inputs from the detection circuit 40 to the microprocessor 32. As the platform 24 receives the user's weight, the coded disc 48 moves to provide pulses, initiating the weighing time period of above 4.5 seconds. While the weighing is in process, the red LED 134 is turned on by the control processor and the LCD display 26 remains blank.

The microprocessor 32 is provided with a memory to handle at least two users, e.g., M1 and M2. When a user uses the scale for the first time, the microprocessor must be informed as to whether it is M1 or M2. The initial command will be "good day, who are you?" The user then presses the button he desires to use to identify himself, M1 or M2. Thereafter, in subsequent uses, if the user weights within five pounds of his previous weight, the voice circuit will address him, "Good day M1" (or M2). If a different user than M1 or M2 weighs and if the weight is not within the five-pound limit, the speech processor says, "Good-day, who are you?"

At this point in the "goal" mode, the user (M1 or M2) may select a "goal weight associated with his or her diet and/or exercise program. (See FIG. 10B) This "goal" weight is set in the microprocessor memory (M1 or M2) by pressing the + and — buttons on the display console and watching the appropriate readout box. The goal weight can be adjusted up or down through a counter so that it can be readily set on precisely the desired weight, and once set on the display, it is in the microprocessor memory. At any time after the initial "goal" weight setting, such goal weight can be reviewed and adjusted or changed at the display console.

The invention's weight projection is based on documented weight loss or gain data over a period of time. As a result, it is well to allow 21 days of use to take place in order to obtain an accurate projection of the number of days it will require a dieter to reach his or her goal weight.

In order to obtain a prediction after a few days, it is possible to set up the weight goal and projection operation as follows:

1. While the time and date are being displayed, depress the SET key twice. Only the date will appear on the display.

2. Set the month for one month prior to the current month by depressing the + key until the correct month appears on the display. Then, depress the SET key again. Both the time and date will reappear on the display.

3. The user steps onto the weighing platform. The synthesized voice will say, for example, "good day, who are you?". The display will show the user's current weight. If he wishes to be referred to as M-1, he will depress the M-1 button. If he wishes to be referred to as M-2, he will depress the M-2 button. Instantly, the device will acknowledge this by speaking "M-1" or "M-2", and the display will show M-1 or M-2, and the user's current weight will appear in the goal weight display like this:

| | |
|---|---|
| 124.0 | 5-24 |
| M-1 | |
| 124.0 | |

4. The user steps off the weighing platform and depresses the SET key twice. The date only will then appear on display. He depresses the + key once, and the month will advance to the current month. He then depresses the SET key once more. The date and time will reappear on the display.

5. The user again steps on the weighing platform. The voice will say "good day M-1 (or M-2). Congratulations!" The display will at this time show the user's current weight and the weight goal as the same number. At this point he can input his real goal weight by depressing the + key, if he wishes to weigh more, or the — key if he wishes to weigh less. When satisfied with the weight goal, he releases the + or — key and steps off the weighing platform.

When a "review" key is activated on the display, the user's current weight, his review weights, and the review months are displayed, month by month. Depending on the new weight data, signals are produced by the microprocessor and supplied to the voice synthesis circuit 30, as well as to the display.

The review function can provide both M-1 and M-2, with a long-term weight trend. This enables M-1 and M-2 to review their weights for the previous six months. For example, suppose that on June 24, M-1 started a diet by setting a weight goal and depressing SET. On the 24th of each subsequent month, the scale will store M-1's first weight reading of that day. If M-1 does not weigh that day, the scale will store the reading for the nearest date.

Anytime M-1 or M-2 stands on the weighing platform with their present weight displayed, they can command a display of their weight history for the previous six months. This is accomplished by depressing the REVIEW key.

EXAMPLE

| | In review function, this number shows month, not days. | | |
|---|---|---|---|
| Depress | Mode | Display | |
| | On November 24, | 110.0 | 11-24 |
| | with M-1 standing on scale | M1 → | |
| | | 110.0 | 00 |
| REVIEW | On June 24, | 110.0 | 11-24 |
| | M-1 weighed 124 lbs. | M1 ← | |
| | | 124.0 | 6 |
| REVIEW | On July 24, | 110.0 | 11-24 |
| | M-1 weighed 120.0 lbs. | M1 ← | |
| | | 120.0 | 7 |
| REVIEW | On August 24, | 110.0 | 11-24 |
| | M-1 weighed 119.0 lbs. | M1 ← | |
| | | 119.0 | 8 |
| REVIEW | On September 24, | 110.0 | 11-24 |
| | M-1 weighed 115.0 lbs. | M1 ← | |
| | | 115.0 | 9 |
| REVIEW | On October 24, | 110.0 | 11-24 |
| | M-1 weighed 112.0 lbs. | M1 ← | |
| | | 112.0 | 10 |
| REVIEW | On November 24, | 110.0 | 11-24 |
| | M-1 weighed 110.0 lbs. | M1 ← | |
| | | 110.0 | 00 |

For recording weight history, it is best to weigh at the same time each day. If for any reason, the weight which memory records is not the weight the user wishes to remain in his history record, he can change this by depressing the + key or the − key while in the review mode. This can be extremely useful in two circumstances. First, he can record any previous knowledge, and thus not have to wait to see his history. Second, if he was unable to weigh at his normal time, and the later weight distorts his history, he can change that weight recording.

If his weight for November 24 was not taken at his usual time and, instead, he weighed 119 lbs. at night after eating a very large dinner, he might on the following morning find he weighed 116 lbs. and he might prefer that 116 lbs. rather than his actual weight of 119 lbs. be recorded in the REVIEW history, then:

| Depress REVIEW (3 times) | |
|---|---|
| 110.0 | 11-24 |
| M1 ← | |
| 119.0 | 8 |
| Depress - key and hold | |
| 110.0 | 11-24 |
| M1 ← | |
| 116.0 | 8 |

Depending on the user's present weight relative to his last previous weight, the microprocessor will generate and supply signals to the voice circuit which will then create an appropriate command. The memory of the voice circuit is supplied with a variety of stored comments, each one of which is programmed to be activated under special circumstances. For example, if the user's present actual weight is equal to or below the latest previous weight, the voice circuit will be programmed to produce a favorable comment such as "congratulations, M1" or "fantastic". If, however, the present actual weight is considerably above the latest weight, the comment produced will be unfavorable, such as "oh oh" or "bad news", as shown in the following table:

| last weight minus current weight | −2 lbs. | −2 lbs. | no change | +2 lbs. | +2 lbs. |
|---|---|---|---|---|---|
| weight loss diet | "fantastic" | "congratulations" | "congratulations" | "oh oh" | "bad news" |
| weight gain diet | "bad news" | "oh oh" | "congratulations" | "congratulations" | "fantastic" |

The voice comments are based on two factors:

A. If goal weight is set above the diet starting weight, then increasing weight is verbally rewarded (or vice versa for weight loss diet where goal weight is set below the diet starting weight).

B. From A. (where goal weight is set with respect to the starting weight) the control processor compares the current weight with the last previous weight.

EXAMPLE

Monday:
The user starts diet at 150 lbs. by pressing and holding the "SET" key for four seconds. He sets his goal to 140 lbs.

Tuesday:
The user weighs 147 lbs. Speech - "fantastic" (150 − 147 = 3 lbs.). The goal could be attained in 5 days.

Wednesday:
He weighs 148 lbs. Speech - "oh oh" (147 − 148 = −1 lb.). The goal could now be attained in 9 days.

Thursday:
He weighs 147 again. Speech - "congratulations" (148 − 147 = 1 lb.). The goal may still be attained in 9 days.

Friday:
He weighs 147 again. Speech - "congratulations" (gives him credit for not reversing). The goal time will now go out to 14 days because his progress from his start weight to his current weight is only 3 lbs. in 4 days.

The user can observe the number of days it takes before reaching his present "goal" weight, when his present weight is between the starting weight and goal weight, and when more than 1 day has passed since the starting date. Several conditions can exist which the user can modify.

A. Change the goal weight—the days predicted to reach the goal will increase as the goal weight/starting weight separation increases, and the goal decreases as that separation becomes smaller.

B. If the user has achieved or exceeded his goal weight, the display 26 shows 0 days, but if the goal is changed to a new value where the present weight is again between start and goal weights, then the days projections will appear in relation to the new goal weight which the user wishes to observe.

C. If the user has negative results on a diet (i.e. weight is above the starting weight and the display shows dashes), he can alter the goal to a point above his weight. Then the display will show what he can expect if he continues at his current rate.

D. If the user diets for 3 weeks on a specific program, and reaches a point with say, 10 days remaining, he can change the goal weight until the "days" display shows 10 days. The goal weight now represent the final weight he should expect to achieve on the diet program.

E. The same information can be shown (in reverse form) for off-diet periods, to show how much he may expect to gain at his present rate of over-eating.

"TARE" weight is typically used when both a mother and her growing baby are to be weighed. The mother first weighs herself. She may be M1 or not even recognized by the scale. Her current weight is maintained in memory. Now she can press the "TARE" key, pick up the baby and get back on the scale within about 7.5 seconds of pressing "TARE". The word "TARE" will show in the display at first; then the scale weighs both mother and baby. The control microprocessor 32 now subtracts the mother's last weight from the mother and baby weight total to give only the baby's weight. This weight might be recognized as M2, for example, and could be on a weight-increasing diet, while the mother, if M1, could be on a weight-loss diet. The baby's history can continue even after the baby is able to get on or stay on the scale without the mother holding it. The only difference will be that "TARE" key will not be pressed when only the baby is on scale.

Often it is desirable to weight an object that is difficult or dangerous to set on the weighing platform. Although most scales will provide this service if you weigh with and without the object, then subtract the difference, the present invention will automatically and more accurately perform this service without the user having to perform any calculations.

EXAMPLE

A mother wishes to weigh her baby. She steps onto the platform, and the display shows:

| 110.0 | 11-25 |
|---|---|
| M1 → | |
| 110.0 | 0:0 |

Now, without stepping off the platform, she can move the position of her feet so that they uncover the two holes they were covering on the platform. After a wait until the display returns to time/date mode, it will display only:

| | 11-25 |
|---|---|
| P | 8:30 |

Then she carefully depresses the ON key, and the display blanks.

Then, she may have baby placed in her arms and, waiting for approximately four seconds, here "Good day. Who are you?"

| 18.0 | 11-25 |
|---|---|
| M? | |

Thus, the baby weight is 18 lbs.

Another feature is the recall of the diet starting weight and the starting date. By pressing the "SET" key, the current diet starting weight and date are displayed. Continuing to hold the "SET" key will re-start a diet with the current weight and date.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A talking electronic scale for encouraging the use of and adherence to a preset diet program, comprising:
    weighing means for determining the weight of a person on the scale,
    display means connected to said weighing means for displaying said weight,
    comparison means for comparing his present weight, his most recent past weight, and his goal weight,
    memory means connected to said weighing means for storing a goal weight for the person and his weight each time he weighs, along with the date of each stored weight, and a series of comments to be voiced,
    voice synthesis means connected to said comparison means and said memory means for providing preselected said comments appropriate to said comparison,
    audio means connected to said voice synthesis means for speaking those comments audibly to the user,
    manually activated individual identification means, for use by the user in his first weighing of a diet program coupling his scale identify and initial weight and placing them in said memory means,
    recognition means connected to said memory means for subsequently identifying that user each time he weighs by the relative closeness of his weight to his last previous weight, so long as he does not vary from that weight by more than a preselected amount, and
    address means connecting said recognition means to said voice synthesis means so that the comments are addressed to the user audibly by stating his scale identity.

2. A talking electronic scale for encouraging the use of and adherence to a present diet program, comprising:
    weighing means for determining the weight of a person on the scale, display means connected to said weighing means for displaying said weight, comparison means for comparing his present weight, his most recent past weight, and his goal weight, memory means connected to said weighing means for storing a goal weight for the person and his weight each time he weighs, along with the date of each stored weight, and a series of comments to be voiced, voice synthesis means connected to said comparison means and said memory means for providing preselected said comments appropriate to said comparison, and audio means connected to said voice synthesis means for speaking those comments audibly to the user, said weighing means (including a weighing platform on which the user stands during weighing, said platform including a pair of light-transmitting openings which are covered by the user's feet when he stands on the platform, light-sensing means below each said opening of said platform, and activating means connected to said light-sensing means and responsive to the decrease in light due to the user's feet covering said opening, for activating said display means, said comparison means, said voice synthesis means, and said audio means, all of which are normally deactivated, so that the present weight is displayed and said comments spoken soon after the user steps on the weighing platform.

3. The scale of claim 2 having delay means for delaying the display and comments for a few seconds, to assure scale stability first.

4. The scale of claim 2 wherein said weighing platform includes a third light-transmitting opening placed where it is unlikely that a user will cover it with his foot, for transmitting ambient room light, third light-sensing means below said third opening, disabling means activated by said third light-sensing means for preventing activation of said activating means when the ambient room light drops below a predetermined level, and a manual overriding switch for activating said activating means regardless of the status of any of said light-sensing means.

* * * * *